(12) United States Patent
Kwon et al.

(10) Patent No.: US 10,993,184 B2
(45) Date of Patent: Apr. 27, 2021

(54) METHOD OF MANAGING BACKUP POWER FOR WIRELESS VEHICLE COMMUNICATION AND POWER MANAGEMENT SYSTEM USING THE SAME

(71) Applicants: Hyundai Motor Company, Seoul (KR); Kia Motors Corporation, Seoul (KR); Yura Corporation Co., Ltd., Seongnam Gyeonggi-do (KR)

(72) Inventors: Hae Yun Kwon, Gyeonggi-do (KR); Young Hoon Kwon, Seoul (KR); Hyun Gil Kang, Gyeonggi-do (KR); June Hee Park, Seoul (KR)

(73) Assignees: Hyundai Motor Company, Seoul (KR); Kia Motors Corporation, Seoul (KR); Yura Corporation Co., Ltd., Gyeonggi-do (KR)

(*) Notice: Subject to any disclaimer, the term of this patent is extended or adjusted under 35 U.S.C. 154(b) by 45 days.

(21) Appl. No.: 16/659,860

(22) Filed: Oct. 22, 2019

(65) Prior Publication Data

US 2020/0374803 A1    Nov. 26, 2020

(30) Foreign Application Priority Data

May 23, 2019  (KR) .................. 10-2019-0060623

(51) Int. Cl.
*G05B 1/01* (2006.01)
*H04W 52/02* (2009.01)
*H04W 4/80* (2018.01)
*H04W 76/19* (2018.01)
*H04W 4/48* (2018.01)

(52) U.S. Cl.
CPC ......... *H04W 52/0251* (2013.01); *H04W 4/48* (2018.02); *H04W 4/80* (2018.02); *H04W 76/19* (2018.02)

(58) Field of Classification Search
None
See application file for complete search history.

(56) References Cited

U.S. PATENT DOCUMENTS

| | | | |
|---|---|---|---|
| 2005/0088206 A1* | 4/2005 | Koch | G06F 1/3203 327/77 |
| 2014/0091906 A1* | 4/2014 | Lee | G05B 1/01 340/5.61 |
| 2014/0257546 A1* | 9/2014 | Mizutani | G05B 19/0421 700/108 |

* cited by examiner

*Primary Examiner* — Gary Lafontant
(74) *Attorney, Agent, or Firm* — Mintz Levin Cohn Ferris Glovsky and Popeo, P.C.; Peter F. Corless

(57) ABSTRACT

A method of managing backup power for wireless vehicle communication is provided. The method includes determining whether a vehicle is turned on or off and when the vehicle is turned off, determining whether a wireless communication unit in the vehicle is in a sleep mode. When the wireless communication controller is in the sleep mode, the wireless communication controller is converted into a standby mode, and power-switching control is performed based on a standby time according to the standby mode.

19 Claims, 8 Drawing Sheets

METHOD OF MANAGING BACKUP POWER FOR WIRELESS VEHICLE COMMUNICATION AND POWER MANAGEMENT SYSTEM USING THE SAME

CROSS-REFERENCE TO RELATED APPLICATION(S)

This application claims the benefit of Korean Patent Application No. 10-2019-0060623, filed on May 23, 2019, which is hereby incorporated by reference as if fully set forth herein.

BACKGROUND

Field of the Invention

The present invention relates to a method and system for managing backup power for wireless vehicle communication, and more particularly, to a method and system for managing backup power for wireless vehicle communication that minimizes an amount of dark current consumed in a standby time of a wireless communication controller.

Discussion of the Related Art

Recently, as a plurality of controllers are being added to a vehicle, research has been conducted regarding a method of effectively using a limited battery resource. In particular, a service for continuously and wirelessly outputting a signal to provide a requested function for convenience before a user physically approaches a vehicle is operated even after the vehicle is turned off, and thus it is important to consider the use of a battery. Accordingly, an appropriate search period of a smart key system is arbitrarily set by a controller to thus minimize battery consumption after a vehicle is turned off.

However, the access specification of a controller of wireless communication, such as LTE communication, with respect to wireless output is defined according to international standards, and thus it is not possible to arbitrarily change the access specification. A service for providing convenience that reflects user characteristics based on big data has been introduced in various fields. The service provides optimum results in consideration of user habits/patterns. However, the corresponding case is rarely applied to control of a controller in a vehicle. In addition, as technology for an autonomous vehicle has developed, there has been increasing need for a fail-safe function of a vehicle safety controller.

A conventional wireless communication controller using a telematics controller needs to be on standby to provide a remote service for a substantial period of time even after a vehicle is turned off. However, it is not possible to arbitrarily release access to a wireless network according to international standards, and thus dark current, consumed during standby time of a corresponding controller, is inevitably increased.

SUMMARY

Accordingly, the present invention is directed to a method of managing backup power for wireless vehicle communication and a power management system using the same that substantially obviates one or more problems due to limitations and disadvantages of the related art. An object of the present invention is to provide a method and system for managing backup power for wireless vehicle communication.

In particular, according to the present invention, a backup power system may be configured in a wireless communication controller and may be analyzed and used based on vehicle information, thereby minimizing an amount of dark current consumed in a standby time of a wireless communication controller. Accordingly, a control method of maximizing the period of use of a battery of the vehicle may be provided.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of managing backup power for wireless vehicle communication may include determining whether a vehicle is turned on or off, when the vehicle is turned off, determining whether a wireless communication unit in the vehicle is in a sleep mode, when the wireless communication controller is in the sleep mode, converting the wireless communication controller into a standby mode, and performing power-switching control based on a standby time according to the standby mode.

In another aspect of the present invention, a power management system for power-switching control may include a battery as a main power source; and a wireless communication controller including a backup capacitor as a sub power source, wherein the wireless communication controller may be configured to determine whether a vehicle is turned on or off, and when the vehicle is turned off, whether a current mode is a sleep mode may be determined, and in the case of the sleep mode, the wireless communication controller may be converted into a standby mode, and power-switching control may be performed based on a standby time according to the standby mode.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
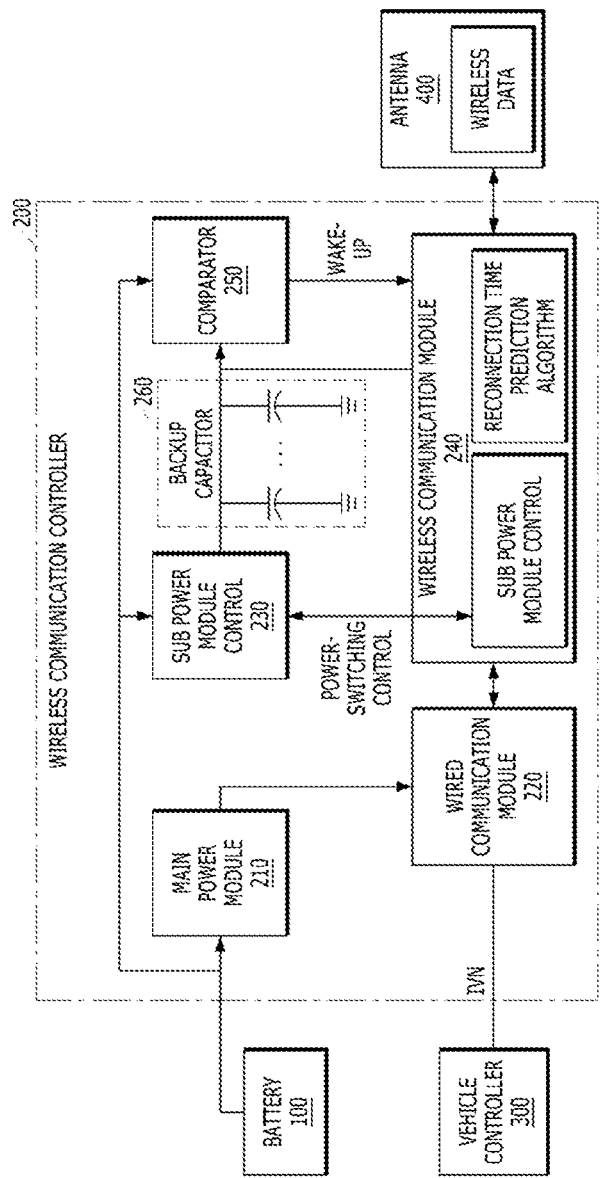
FIG. 1 is a diagram showing a power management system for wireless vehicle communication according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions. In description of exemplary embodiments, it will be understood that, when an element is referred to as being "on" or "under" another element, the element can be directly on another element or intervening elements may be present.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "access" another element, one element may be "connected to", "coupled to", or "access" another element via a further element although one element may be directly connected to or directly access another element.

All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings in the related art from the context. Unless differently defined in the present invention, such terms should not be interpreted in an ideal or excessively formal manner.

FIG. 1 is a diagram showing a power management system for wireless vehicle communication according to an exemplary embodiment of the present invention. Referring to FIG. 1, the power management system for wireless vehicle communication according to an exemplary embodiment of the present invention may include a battery 100, a wireless communication controller 200, a vehicle controller 300, and an antenna 400.

The battery 100 may be a main power source of the wireless communication controller 200. The battery 100 may provide power required to operate a wired communication module 220 and a wireless communication module 240 that are disposed in the wireless communication controller 200. The wireless communication controller 200 may include a main power module 210, the wired communication module 220, a sub power module 230, the wireless communication module 240, a comparator 250, and a backup capacitor 260.

In particular, the main power module 210 may be configured to receive power from the battery 100 and supply the power to the wired communication module 220. The wired communication module 220 may be configured to transmit and receive data to and from the vehicle controller 300 via an in-vehicle network (IVN). The IVN may include controller area network (CAN) communication, local interconnect network (LIN) communication, or the like.

The sub power module 230 may be configured to receive power from the battery 100. In addition, the sub power module 230 may be configured to supply power to the comparator 250 and the wireless communication module 240. In particular, the backup capacitor 260 may be continuously charged by the sub power module 230. The backup capacitor 260 may be disposed between the sub power module 230 and the wireless communication module 240. Accordingly, the backup capacitor 260 may be used as a sub power source of the wireless communication controller 200.

When a driver operates a vehicle, the wireless communication module 240 may be configured to collect information regarding repeating vehicle usage patterns. In other words, the wireless communication module 240 may be configured to collect and analyze information regarding a frequency corresponding to reconnection to a wireless network for each user. The information regarding the frequency corresponding to reconnection to a wireless network may be collected based on wireless data received from the antenna 400.

The wireless communication module 240 may be configured to analyze the collected information through a reconnection time prediction algorithm and predict a time period during which there is a high possibility of reconnection. In other words, the wireless communication module 240 may be configured to predict the reconnection frequency and the reconnection time period after the vehicle is turned off. Accordingly, the wireless communication module 240 may be configured to predict a network reconnection time $T_{re\text{-}connect}$ based on stored data through the reconnection time prediction algorithm.

In particular, when the vehicle is driven, the wireless communication controller 200 may be configured to determine a change in a network reconnection time based on the reconnection time prediction algorithm. Then, when the network reconnection time is changed, the wireless communication controller 200 may be configured to collect and predict information regarding the network reconnection time and update the predicted network reconnection time. Hereinafter, the reconnection time prediction algorithm will be described in detail with reference to FIG. 6.

The wireless communication controller 200 may be configured to determine whether the vehicle is turned on or off. When the vehicle is turned off, the wireless communication controller 200 may be configured to determine whether the current mode is a sleep mode. When the current mode is the sleep mode, the wireless communication controller 200 may be converted into a standby mode. In particular, the standby mode may be an operation for minimizing current consumption. Accordingly, the wireless communication controller 200 may be configured to minimize functions other than wireless communication.

The wireless communication controller 200 may be configured to perform power-switching control based on the standby time according to the standby mode. Accordingly, the wireless communication controller 200 may be configured to determine whether the standby time according to the standby mode is longer than the network reconnection time $T_{re\text{-}connect}$. In some exemplary embodiments, when the standby time is shorter than the network reconnection time $T_{re\text{-}connect}$, the wireless communication controller 200 may be configured to use the battery 100 as a power source.

In some exemplary embodiments, when the standby time is longer than the network reconnection time $T_{re\text{-}connect}$, the wireless communication controller 200 may be configured to perform power-switching control using the sub power module 230. Accordingly, the wireless communication controller 200 may be configured to perform power-switching control to convert a power source of the wireless communication module 240 from the battery 100 to the backup capacitor 260 through the sub power module 230. In other words, the wireless communication controller 200 may be configured to perform control to use internal power when the standby time is within a preset time based on the predicted time of the network reconnection time $T_{re\text{-}connect}$.

Additionally, when the standby time is longer than a long time $T_{wait}$, the wireless communication controller 200 may be configured to change the current mode to a power-off mode. In particular, the power-off mode may be the state in which power is not supplied to a wireless communication controller. The wireless communication controller 200 may include the comparator 250 configured to detect an abnormality of the battery 100 or an abnormal operation of the backup capacitor 260. The wireless communication controller 200 may be configured to continuously check whether an abnormality of the battery 100 is present using power monitoring.

During an emergency situation such as detection of an abnormality of the battery 100 or an abnormal operation of the backup capacitor 260, the wireless communication controller 200 may be configured to convert a used power source into a source without an abnormality. In some exemplary embodiments, when the vehicle is turned off, the wireless communication controller 200 may be configured to determine whether a backup capacitor is abnormal. When the backup capacitor 260 is abnormal (e.g., error, malfunction, etc.), the wireless communication controller 200 may be configured to change a power source from the backup capacitor 260 to the battery 100.

When the vehicle is turned on, the wireless communication controller 200 may be configured to determine whether the battery 100 is abnormal. When the battery 100 is abnormal, the wireless communication controller 200 may be configured to change a power source from the battery 100 to the backup capacitor 260. Needless to say, it will be obvious to one of ordinary skill in the art that the aforementioned control period connection relationship and function/division of each controller is exemplary and is not limited to the terms.

Figure 2:
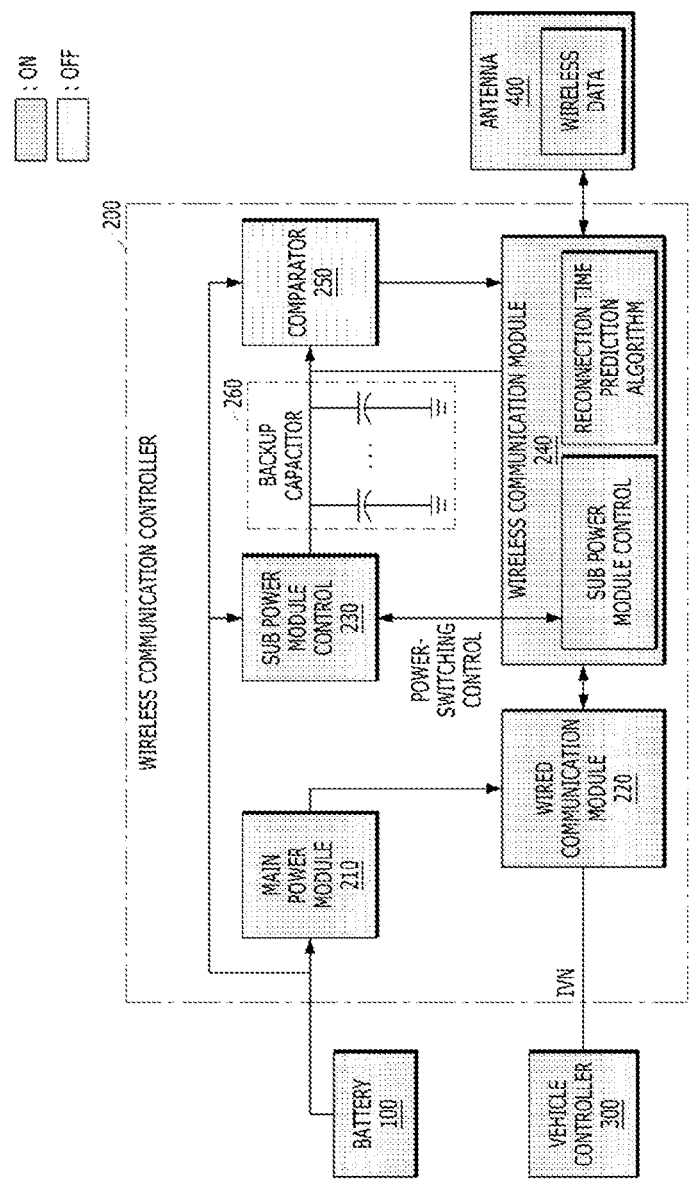
FIGS. 2 and 3 are diagrams showing a power management system according to an exemplary embodiment of the present invention.
Figure 3:
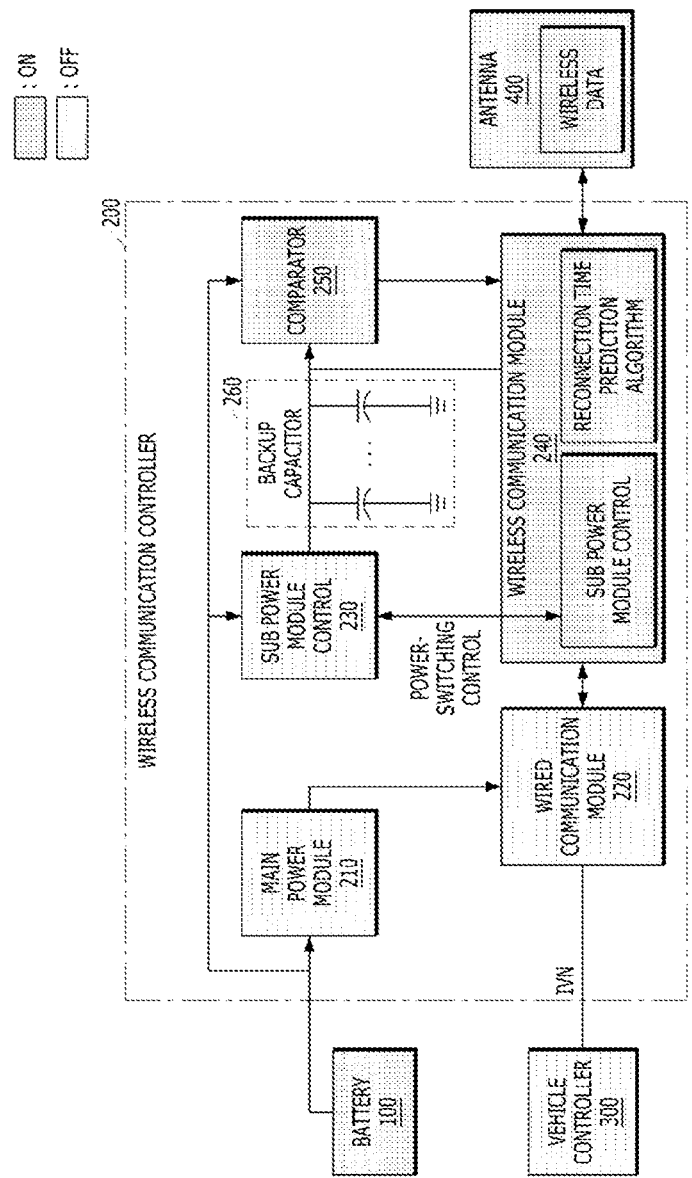

FIGS. 2 and 3 are diagrams showing a power management system according to an exemplary embodiment of the present invention. Referring to FIG. 2, according to a first exemplary embodiment of the present invention, when a vehicle is turned on, the wireless communication controller 200 may be configured to receive power from the battery 100 and supply the power to the main power module 210 and the sub power module 230. Accordingly, the main power module 210 may be configured to supply power to the wired communication module 220, and the wired communication module 220 may be configured to transmit and receive data to and from the vehicle controller 300 via an in-vehicle network (IVN).

The sub power module 230 may be configured to supply power to the wireless communication module 240, and the wireless communication module 240 may be configured to transmit and receive wireless data to and from the antenna 400 via wireless communication. Accordingly, the wireless communication controller 200 may be configured to predict a time $T_{re\text{-}correct}$ during which network reconnection is attempted a high number of times based on the wireless data received from the wireless communication module 240.

According to a second exemplary embodiment of the present invention, when the vehicle is turned off, when the standby time falls within the time $T_{re\text{-}connect}$ in which network reconnection is attempted a high number of times, based on the wireless data, the wireless communication controller 200 may be configured to receive power from the battery 100. In particular, the wireless communication controller 200 may be converted into the standby mode to minimize current consumption.

Referring to FIG. 3, according to a third exemplary embodiment of the present invention, when the vehicle is turned off, when the standby time is longer than the time $T_{re\text{-}connect}$ during which network reconnection is attempted a high number of times, based on the wireless data, the wireless communication controller 200 may be configured to change a power source from the battery 100 to the backup capacitor 260 according to power-switching control. Accordingly, the sub power module 230 may be turned off, and the power stored in the backup capacitor 260 may be supplied to the comparator 250 and the wireless communication module 240. Thus, the wireless communication controller 200 may be configured to wirelessly communicate with the antenna 400. The comparator 250 may be configured to continuously check whether the backup capacitor 260 is abnormal.

Figure 4:
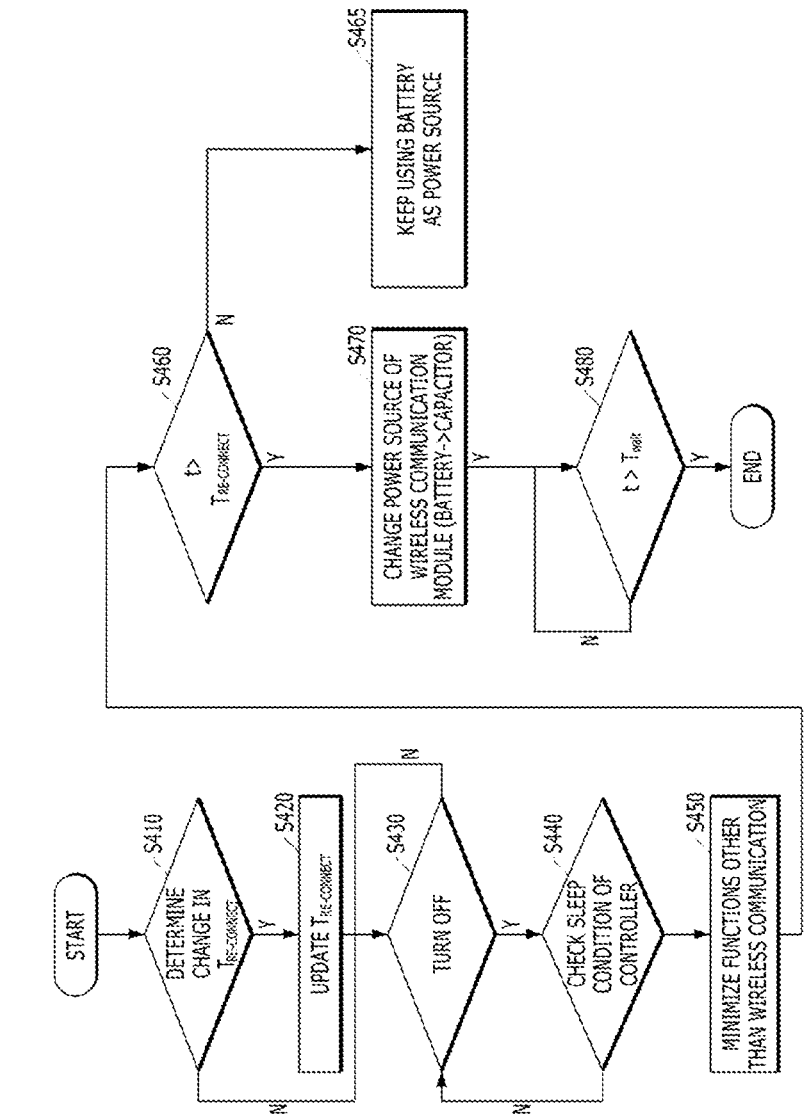
FIG. 4 is a flowchart of a power management operation of a power management system according to an exemplary embodiment of the present invention.

FIG. 4 is a flowchart of a power management operation of a power management system according to an exemplary embodiment of the present invention. Referring to FIG. 4, the wireless communication controller 200 may be configured to determine whether the network reconnection time $T_{re\text{-}connect}$ is changed, based on the reconnection time prediction algorithm (S410). When the network reconnection time $T_{re\text{-}connect}$ is changed (YES of S410), the wireless communication controller 200 may be configured to collect and predict information related to the network reconnection time $T_{re\text{-}connect}$ while the vehicle is driven. Based thereon, the network reconnection time $T_{re\text{-}connect}$ may be updated (S420). Then, the wireless communication controller 200 may be configured to determine whether the vehicle is turned off (S430).

When the network reconnection time $T_{re\text{-}connect}$ is not changed (NO of S410), the wireless communication controller 200 may be configured to determine whether the vehicle is turned off (S430). After operation S430, when the vehicle is turned off (YES of S430), the wireless communication controller 200 may be configured to check a sleep condition (S440). When the vehicle is not turned off (NO of S430), the wireless communication controller 200 may be configured to use the power of the battery 100 as power of the wireless communication module 240 and continuously charge the backup capacitor 260.

After the operation S440, when the current mode is determined to be the sleep mode (YES of S440), the wireless communication controller 200 may be converted into the standby mode for wireless communication only. Accordingly, the wireless communication controller 200 may be operated to minimize functions other than wireless communication (S450). When the current mode is not determined to be the sleep mode (NO of S440), the wireless communication controller 200 may be configured to determine whether the vehicle is turned off. After operation S450, the wireless communication controller 200 may be configured to determine whether a standby time t is longer than the network reconnection time $T_{re\text{-}connect}$ (S460).

When the standby time t is shorter than the network reconnection time $T_{re\text{-}connect}$ (NO of S460), the wireless communication controller 200 may be configured to continue to use the battery 100 as a power source during the network reconnection time $T_{re\text{-}connect}$ (S465). When the standby time t is longer than the network reconnection time $T_{re\text{-}connect}$ (YES of S460), the wireless communication controller 200 may be configured to perform control to change a power source. Accordingly, a power source of the wireless communication module 240 of the wireless communication controller 200 may be changed from the battery 100 to the backup capacitor 260 (S470). After operation S470, whether the standby time t is longer than a preset time $T_{wait}$ may be determined. When the standby time t is longer than the preset time $T_{wait}$ (YES of S470), the wireless communication controller 200 may be converted into a power-off mode.

Figure 5:
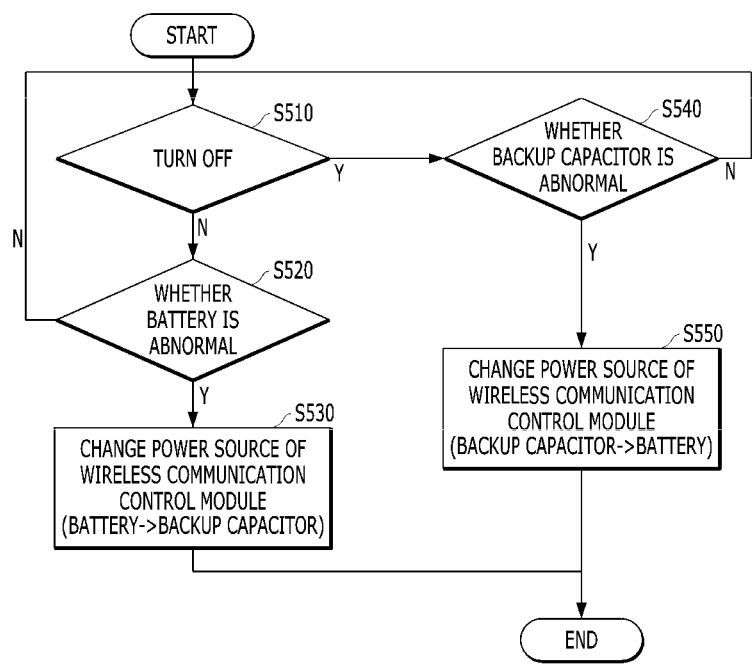
FIG. 5 is a flowchart of backup power management logic of a power management system according to an exemplary embodiment of the present invention.

FIG. 5 is a flowchart of backup power management logic of a power management system according to an exemplary embodiment of the present invention. Referring to FIG. 5, the wireless communication controller 200 may be configured to determine whether the vehicle is turned off (S510).

When the vehicle is not turned off (NO of S510), the wireless communication controller 200 may be configured to determine whether the battery 100 is abnormal using the comparator 250 and power monitoring (S520). When the battery 100 is abnormal (YES of S520), the wireless communication controller 200 may be configured to change a power source of the wireless communication module 240 from the battery 100 to the backup capacitor 260 (S530).

After operation S510, when the vehicle is turned off (NO of S510), the wireless communication controller 200 may be configured to determine whether the backup capacitor 260 is abnormal using the comparator 250 (S540). Then, when the backup capacitor 260 is abnormal (YES of S540), the wireless communication controller 200 may be configured to change a power source of the wireless communication module 240 from the backup capacitor 260 to the battery 100.

Through the aforementioned method, a backup power system may be configured in the wireless communication controller 200 and may be analyzed and used based on vehicle information, thereby minimizing an amount of dark current consumed in the standby time of the wireless communication controller. Accordingly, the period of use of the battery 100 of the vehicle may be maximized to enhance the performance of the vehicle.

Figure 6:
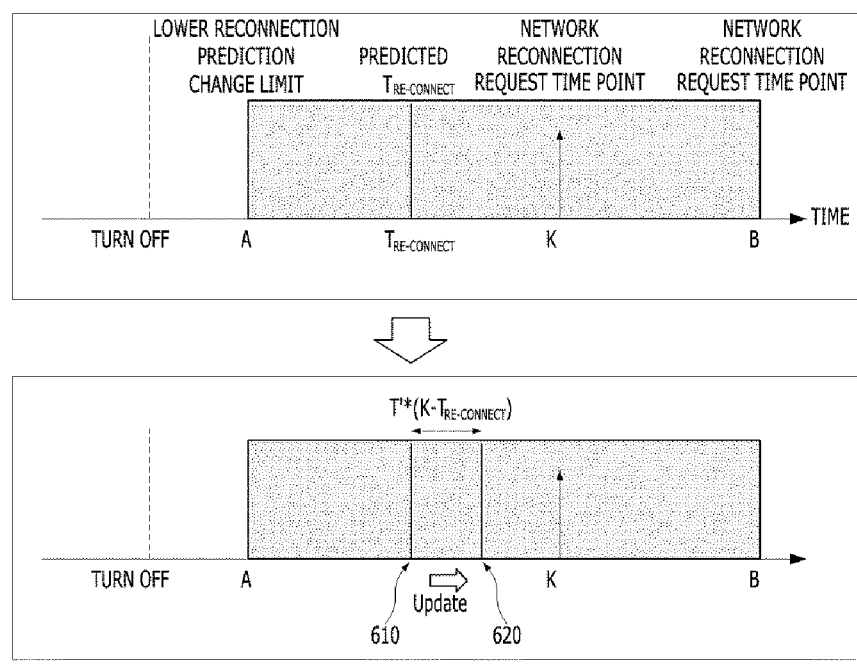
FIGS. 6 and 7 are diagrams for explanation of an operation of a reconnection time prediction algorithm according to an exemplary embodiment of the present invention.
Figure 7:
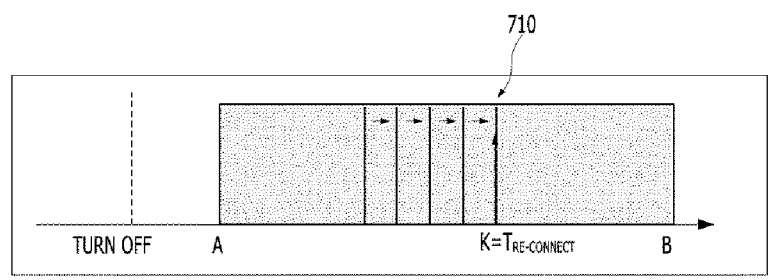

FIGS. 6 and 7 are diagrams for explanation of an operation of a reconnection time prediction algorithm according to an exemplary embodiment of the present invention. Referring to FIG. 6, when the vehicle is turned off, the wireless communication controller 200 may be configured to check a change in a network reconnection request time point K and determine whether the network reconnection request time point K falls within a reconnection prediction change range.

In other words, the wireless communication controller 200 may be configured to determine whether the network reconnection request time point K of a user is later than a lower reconnection prediction change limit A or is earlier than an upper reconnection prediction change limit B. Accordingly, when the network reconnection request time point K falls within the reconnection prediction change range, the wireless communication controller 200 may be configured to predict the network reconnection time $T_{re\text{-}connect}$.

Then, the wireless communication controller 200 may be configured to update a predicted network reconnection time value 620 based on the network reconnection request time point K. The updated predicted network reconnection time value 620 may be a value obtained by multiplying a difference between the network reconnection request time point K and a network reconnection time value 610 prior to prediction with a preset update constant T'. Accordingly, the wireless communication controller 200 may be configured to collect information regarding a time period during which network reconnection is attempted a high number of times and may be configured to predict and update a value of the network reconnection time $T_{re\text{-}connect}$ according to the user.

As shown in FIG. 7, when reconnection frequently occurs at the network reconnection request time point K, that is, the network reconnection time $T_{re\text{-}connect}$ may approach the network reconnection request time point K. In some exemplary embodiments, a changed network reconnection time value 710 may have the same value as the network reconnection request time point K. In other words, when reconnection frequently occurs at the network reconnection request time point K, the wireless communication controller 200 may be configured to update a reconnection prediction time change to be appropriate to the user.

Figure 8:
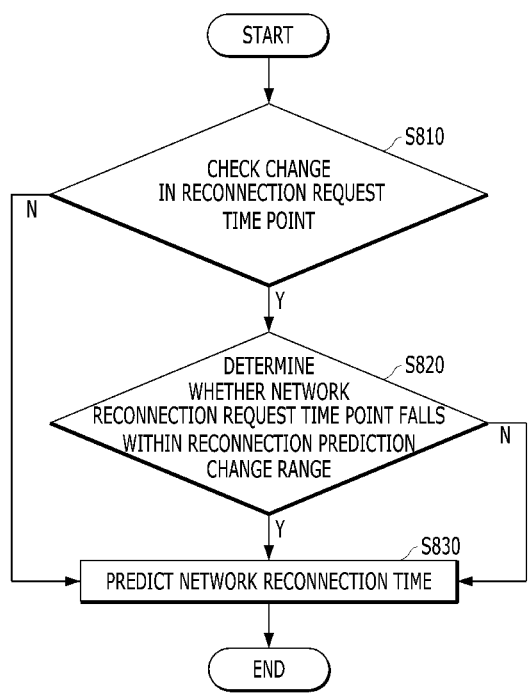
FIG. 8 is a flowchart showing an operation of a reconnection time prediction algorithm according to an exemplary embodiment of the present invention.

FIG. 8 is a flowchart showing the operation of a reconnection time prediction algorithm according to an exemplary embodiment of the present invention. Referring to FIG. 8, the wireless communication controller 200 may be configured to check a change in the network reconnection request time point K (S810). When the network reconnection request time point K is not changed (NO of S810), the reconnection time prediction algorithm may be terminated.

After operation S810, when the network reconnection request time point K is not changed, the wireless communication controller 200 may be configured to determine whether the network reconnection request time point K falls within the reconnection prediction change range (S820). When the network reconnection request time point K does not fall within the reconnection prediction change range (NO of S820) (e.g., is beyond the range), the reconnection time prediction algorithm may be terminated.

After operation S820, when the network reconnection request time point K falls within the reconnection prediction change range, the wireless communication controller 200 may be configured to predict the network reconnection time $T_{re-connect}$ (S830). Through the aforementioned method, the wireless communication controller 200 may be configured to update a reconnection prediction time change to be appropriate to the user using the reconnection time prediction algorithm.

A method and system for managing backup power for wireless vehicle communication according to the present invention may have the following effects.

First, a frequency corresponding to reconnection and a reconnection time period after a vehicle is turned off may be predicted, power of a battery may be used for a time period that is predicted based on a use pattern of a driver, and then internal power of a controller may be used for a long standby time, based on the prediction result, thereby minimizing consumption of a battery of the vehicle.

Second, when an unpredicted situation occurs that may cause an accident while the vehicle is being driven, that is, when a battery enters an abnormal state while the vehicle is being driven, backup power may be capable of being temporally supplied in consideration of fail-safety, and thus a large-scale accident may be prevented, thus improving driving safety.

It will be appreciated by persons skilled in the art that that the effects that could be achieved with the present invention are not limited to what has been particularly described hereinabove and other advantages of the present invention will be more clearly understood from the detailed description.

The aforementioned present invention can also be embodied as computer readable code stored on a non-transitory computer readable recording medium. The non-transitory computer readable recording medium is any data storage device capable of storing data which may thereafter be read by a computer. Examples of the computer readable recording medium include a hard disk drive (HDD), a solid state drive (SSD), a silicon disc drive (SDD), read-only memory (ROM), random-access memory (RAM), CD-ROM, magnetic tapes, floppy disks, optical data storage devices, etc. The non-transitory computer readable recording medium may also be distributed over network coupled computer systems so that the computer readable code is stored and executed in a distributed fashion. Also, functional programs, code, and code segments for accomplishing the present invention may be easily construed by programmers skilled in the art to which the present invention pertains.

What is claimed is:

1. A method of managing backup power for wireless vehicle communication, comprising:
   determining, by a controller, whether a vehicle is turned on or off;
   determining, by the controller, whether a wireless communication unit in the vehicle is in a sleep mode when the vehicle is turned off;
   converting, by the controller, the wireless communication controller into a standby mode when the wireless communication controller is in the sleep mode; and
   performing, by the controller, power-switching control based on a standby time according to the standby mode.

2. The method of claim 1, further comprising:
   checking, by the controller, a change in a network reconnection request time point;
   determining, by the controller, whether the network reconnection request time point falls within a reconnection prediction change range;
   predicting, by the controller, a network reconnection time when the network reconnection request time point falls within the reconnection prediction change range; and
   updating, by the controller, the predicted network reconnection time.

3. The method of claim 2, wherein the performing power-switching control includes determining whether the standby time is longer than the network reconnection time.

4. The method of claim 3, further comprising:
   changing, by the controller, a power source disposed in the wireless communication controller from a battery to a backup capacitor when the standby time is longer than the network reconnection time.

5. The method of claim 4, further comprising:
   determining, by the controller, whether the standby time is longer than a preset time when the power source is changed to the backup capacitor; and
   converting, by the controller, the wireless communication controller to a power-off mode when the standby time is longer than the preset time.

6. The method of claim 3, further comprising:
   when the standby time is shorter than the network reconnection time, continuing use of a battery as a power source.

7. The method of claim 1, further comprising:
   charging, by the controller, a backup capacitor disposed in the wireless communication controller when the vehicle is turned on.

8. The method of claim 1, further comprising:
   determining, by the controller, whether the backup capacitor is abnormal when the vehicle is turned off; and
   changing, by the controller, a power source from the backup capacitor to a battery when the backup capacitor is abnormal.

9. The method of claim 1, further comprising:
   determining, by the controller, whether a battery is abnormal when the vehicle is turned on; and
   changing, by the controller, a power source from the battery to a backup capacitor when the battery is abnormal.

10. A non-transitory computer readable recording medium having recorded thereon a program for executing the method of managing backup power for wireless vehicle communication of claim 1.

11. A power management system for power-switching control, comprising:
    a battery as a main power source; and
    a wireless communication controller including a backup capacitor as a sub power source,
    wherein the wireless communication controller is configured to:
      determine whether a vehicle is turned on or off;
      when the vehicle is turned off, determine whether a current mode is a sleep mode;
      when the current mode is the sleep mode, convert into a standby mode, and perform power-switching control based on a standby time according to the standby mode.

12. The power management system of claim 11, wherein the wireless communication controller is configured to:
- check a change in a network reconnection request time point;
- determine whether the network reconnection request time point falls within a reconnection prediction change range;
- predict a network reconnection time when the network reconnection request time point falls within the reconnection prediction change range; and
- update the predicted network reconnection time.

13. The power management system of claim 12, wherein the wireless communication controller is configured to determine whether the standby time is longer than the network reconnection time.

14. The power management system of claim 13, wherein, when the standby time is longer than the network reconnection time, the wireless communication controller is configured to change a power source from the battery to the backup capacitor.

15. The power management system of claim 14, wherein the wireless communication controller is configured to determine whether the standby time is longer than a preset time when the power source is changed to the backup capacitor, and convert the wireless communication controller to a power-off mode when the standby time is longer than the preset time.

16. The power management system of claim 13, wherein, when the standby time is shorter than the network reconnection time, the wireless communication controller is configured to continue to use the battery as a power source.

17. The power management system of claim 11, wherein, when the vehicle is turned on, the wireless communication controller is configured to charge the backup capacitor.

18. The power management system of claim 11, wherein, when the vehicle is turned off, the wireless communication controller is configured to determine whether the backup capacitor is abnormal, and change a power source from the backup capacitor to the battery when the backup capacitor is abnormal.

19. The power management system of claim 11, wherein, when the vehicle is turned on, the wireless communication controller is configured to determine whether the battery is abnormal, and change a power source from the battery to the backup capacitor when the battery is abnormal.

\* \* \* \* \*